E. O. Brinckerhoff,
Cracker Machine,
N° 39,628. Patented Aug. 25, 1863.

Witnesses:

Inventor:
E. O. Brinckerhoff

UNITED STATES PATENT OFFICE.

E. O. BRINCKERHOFF, OF NEW YORK, N. Y.

IMPROVED CRACKER-CUTTING MACHINE.

Specification forming part of Letters Patent No. 39,628, dated August 25, 1863.

*To all whom it may concern:*

Be it known that I, E. O. BRINCKERHOFF, of No. 90 Elizabeth street, in the city, county, and State of New York, have invented a new and useful Improvement in Cracker-Cutting Machines; and I do hereby declare that the following is a full, clear, and exact description of the same, reference being had to the accompanying drawings, making a part of this specification, in which—

Figure 1:
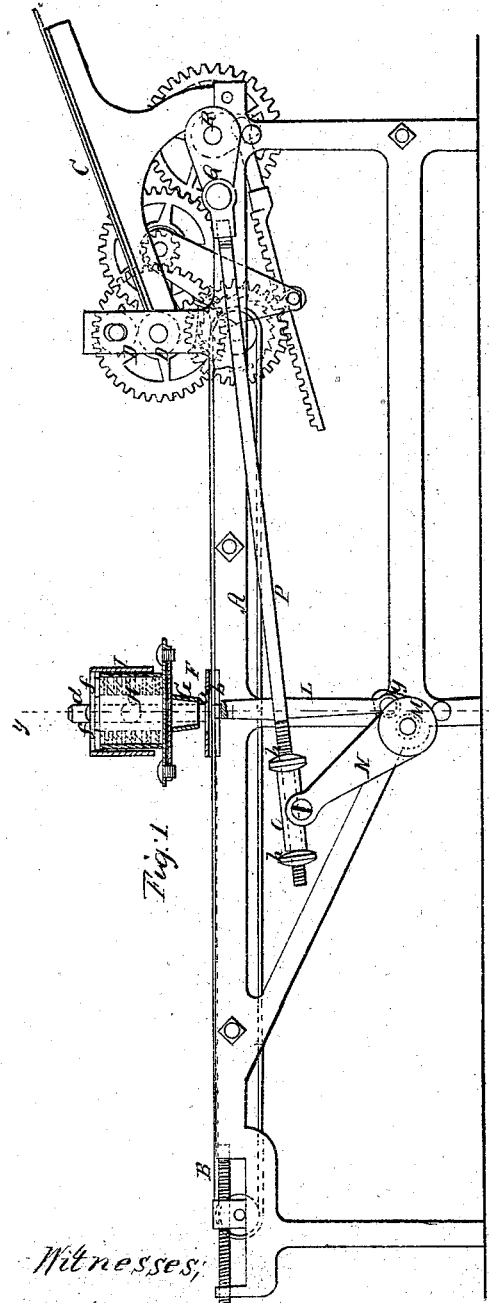
Figure 2:
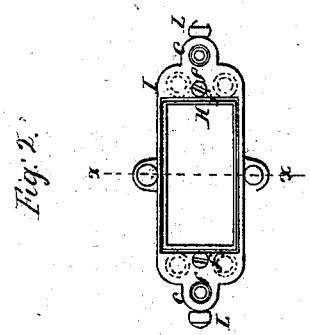
Figure 3:
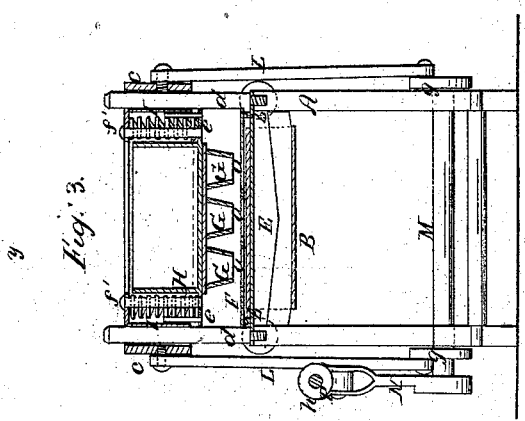

Figure 1 is a side view of a cracker-cutting machine having its cutting apparatus in section $x\,x$, Fig. 2, indicating the plane of section; Fig. 2, a detached plan or top view of the cutting apparatus; Fig. 3, a transverse vertical section of the machine, taken in the line $y\,y$, Fig. 1.

Similar letters of reference indicate corresponding parts in the several figures.

This invention relates to an improvement in the cutting apparatus of cracker-machines, whereby the same is made to cut in a more uniform manner than heretofore, and without subjecting any of the working parts of the machine to undue strain, and at the same time compensating for any unevenness in the sheet of dough and insuring a perfect clean cut at all times.

The invention consists in having the cutters attached to a cross-head, which is fitted loosely within another cross-head with springs interposed between the two, the above parts being operated so as to have an up-and-down motion by means of pitmen attached to arms connected with a rock-shaft to which motion is communicated by an arm connected to a pitman in such a manner that the length of the stroke of the cutters may be regulated as desired.

To enable those skilled in the art to fully understand and construct my invention, I will proceed to describe it.

A represents a frame, in the upper part of which there is placed an endless apron, B, said frame having at one end of it an inclined feed-board, C, and two pressure-rollers, D D, between which the dough is fed upon the apron B, said apron having an intermittent motion communicated to it by the usual or any proper means.

The above-named parts are the same as those now used in cracker-cutting machines, and therefore form no part of my invention.

E represents a cross-bar, which is permanently secured in the frame A, and over which the upper part of the endless apron B passes, and F is a plate which is placed a trifle above the cross-bar E, and is perforated with circular holes $a$ to admit of the cutters G working through said plate. The ends of the plate F are attached to upright edges $b$ at the ends of the cross-bar E. The cutters G are attached to the lower part of a cross-head, H, which is fitted within another cross-head, I, the latter having an ear, $c$, at each end of it, which is perforated vertically to admit of them being fitted loosely on vertical rods $d\,d$, the latter serving as guides to admit of the free up-and-down movement of the cross-head I, as will be fully understood by referring to Fig. 3. The cross-head H may be hollow or of box form, and a space is allowed between its ends and the ends of the cross-head I to receive spiral springs J, the lower ends of said springs resting on lips $e$ at the ends of the lower part of the cross-head H and the upper ends of the springs bearing against plates $f$ at the top of the cross-head I near its ends. These springs J have a tendency to keep the cross-head H forced downward to the extent of its movement, and this movement is determined by rods K K, the lower ends of which are attached to the lips $e$ of the cross-head H, and the upper ends provided with heads $f'$, which are formed on the upper ends of the rods K above the plates $f$ of the cross-head I, as shown in Fig. 3.

To each end of the cross-head I there is attached a pitman, L, and the lower ends of these pitmen are attached to arms $g\,g$, which are connected to a rock-shaft, M, placed transversely in the lower part of the frame A. To one end of this rock-shaft M there is attached an arm, N, which has a tube, O, pivoted centrally to its upper end, and through which a connecting-rod, P, passes, said rod having a screw-thread cut upon it, on which two nuts, $h\,h$, are fitted, one at each end of the tube O. The outer end of the connecting-rod P is attached to a crank, Q, on the driving-shaft R of the machine.

The operation is as follows: The dough is fed, as usual, down from the feed-board C, between the rollers D D, and upon the endless apron B, the rollers compressing the dough into a thin sheet upon the apron B, and the latter feeding it underneath the cutters G and over the cross-bar E. The apron is moved intermittingly, as before stated, and during the intervals of its movement the cutters G are forced down, so as to cut through the dough, by the pitmen L, which are actuated from the rock-shaft M, the pressure to which the cutters are subjected being governed by the strength of the springs J, as the head I acts upon the head H through the medium of the springs J, the latter yielding to admit of the head I completing its movement. This spring arrangement, it will be seen, compensates for any variation in the thickness of the sheet of dough, and also for any variation from a horizontal position of the cross-bar E. The cutters in consequence will work uniformly well and none of them will be subjected to any undue strain. The cross-bar E serves as a bed-piece directly under the cutters and holds the dough firmly while being acted upon by the cutters. The cutters G rise during each movement of the apron B.

I am aware that cracker-cutting machines have been provided with cross-bars E, resting upon springs to enable the cross-bars to yield under the pressure of the cutters, but that arrangement does not operate perfectly. It is not sufficiently sensitive and does not work with that uniformity and precision as my arrangement.

By having the connecting-rod P attached to the arm N through the medium of the tube O and nuts $h\ h$, as shown, the arm N may be varied in position and the stroke of the cross-head I rendered greater or less with respect to its pressure on the head H, and the cutters G therefore may be subjectd to a greater or less pressure as circumstances may require.

Having thus described my invention, what I claim as new, and desire to secure by Letters Patent, is—

1. The cross-head H, with cutters G attached, in connection with the cross-head I, the springs J, and fixed or permanent cross-bar E, all arranged to operate as and for the purpose specified.

2. The connecting of the rod P to the arm N through the medium of the tube O and nuts $h\ h$, fitted on a screw or rod, P, substantially as and for the purpose set forth.

E. O. BRINCKERHOFF.

Witnesses:
THOS. S. J. DOUGLAS,
WM. REETH.